(12) United States Patent
Wilhoite et al.

(10) Patent No.: US 7,804,821 B2
(45) Date of Patent: Sep. 28, 2010

(54) CIRCUIT SWITCHED CELLULAR NETWORK TO INTERNET CALLING WITH INTERNET ANTENNAS

(75) Inventors: Michael T. Wilhoite, Sammamish, WA (US); Thomas A Carter, Scottsdale, AZ (US)

(73) Assignee: Bridgeport Networks, Inc., Chicago, IL (US)

( * ) Notice: Subject to any disclaimer, the term of this patent is extended or adjusted under 35 U.S.C. 154(b) by 1390 days.

(21) Appl. No.: 10/463,111

(22) Filed: Jun. 16, 2003

(65) Prior Publication Data

US 2003/0224795 A1    Dec. 4, 2003

Related U.S. Application Data

(63) Continuation of application No. PCT/US01/48920, filed on Dec. 13, 2001.

(60) Provisional application No. 60/255,737, filed on Dec. 14, 2000, provisional application No. 60/267,564, filed on Feb. 8, 2001, provisional application No. 60/269,740, filed on Feb. 16, 2001, provisional application No. 60/286,711, filed on Apr. 27, 2001.

(51) Int. Cl.
*H04L 12/66* (2006.01)

(52) U.S. Cl. .................. 370/356; 370/352; 370/401

(58) Field of Classification Search ............... 370/352, 370/356, 401
See application file for complete search history.

(56) References Cited

U.S. PATENT DOCUMENTS 5,159,592 A    10/1992    Perkins (Continued)

FOREIGN PATENT DOCUMENTS

WO      WO92/03878      3/1992

(Continued)

OTHER PUBLICATIONS

*Supplemental European Search Report* in PCT/US01/48920, Jul. 19, 2006.

(Continued)

*Primary Examiner*—Jason E Mattis
(74) *Attorney, Agent, or Firm*—Occhiuti Rohlicek & Tsao LLP

(57) ABSTRACT

A call routing system for use with a wireless telephone systems is disclosed. The system, which monitors the subscriber's current physical location, determines the device to which a call should be terminated, and routes the call. The device can be any IP telephone, including a cable television system adapted to IP telephony. The system routes calls without direct subscriber actions, without a second telephone number, regardless of the time of day and day of week. Various options can also apply to a call, determined by subscriber-established preferences, when specified criteria are met, or calls can be limited to/from specified telephone numbers. The system and method uses signaling techniques that will allow routing of the call, along with any authorization or restrictions, to be done remotely from the actual switching of the call. Call events are transmitted to the call routing system while the communications path of the call is held at the switching system awaiting call routing information. The identity of the subscriber is established using existing means that are used to authenticate the user. The wireless phone user does not have to enter any additional codes or identification to obtain access to the call routing system.

11 Claims, 9 Drawing Sheets

U.S. PATENT DOCUMENTS

| | | | | |
|---|---|---|---|---|
| 5,325,362 | A | 6/1994 | Aziz | |
| 5,708,655 | A | 1/1998 | Toth et al. | |
| 5,717,737 | A | 2/1998 | Doviak et al. | |
| 5,727,737 | A | 2/1998 | Doviak et al. | |
| 5,742,905 | A | 4/1998 | Pepe et al. | |
| 6,009,330 | A | 12/1999 | Kennedy, III et al. | |
| 6,021,126 | A | 2/2000 | White et al. | |
| 6,026,153 | A | 2/2000 | Fuller et al. | |
| 6,038,451 | A | 3/2000 | Syed et al. | |
| 6,052,725 | A | 4/2000 | McCann et al. | |
| 6,058,303 | A * | 5/2000 | Åström et al. | 455/413 |
| 6,075,783 | A | 6/2000 | Voit et al. | |
| 6,081,591 | A | 6/2000 | Skoog | |
| 6,118,778 | A | 9/2000 | Amin | |
| 6,122,263 | A | 9/2000 | Dahlin et al. | |
| 6,125,113 | A | 9/2000 | Farris et al. | |
| 6,131,028 | A | 10/2000 | Whitington | |
| 6,144,671 | A | 11/2000 | Perinpanathan et al. | |
| 6,161,008 | A | 12/2000 | Lee et al. | |
| 6,167,119 | A | 12/2000 | Bartholomew | |
| 6,185,204 | B1 | 2/2001 | Voit | |
| 6,198,920 | B1 | 3/2001 | Doviak et al. | |
| 6,215,790 | B1 | 4/2001 | Voit et al. | |
| 6,219,694 | B1 | 4/2001 | Lazaridis et al. | |
| 6,222,829 | B1 | 4/2001 | Karlsson et al. | |
| 6,236,653 | B1 | 5/2001 | Dalton et al. | |
| 6,243,373 | B1 | 6/2001 | Turock | |
| 6,282,574 | B1 | 8/2001 | Voit | |
| 6,304,753 | B1 | 10/2001 | Hartmaier | |
| 6,317,484 | B1 | 11/2001 | McAllister | |
| 6,324,402 | B1 | 11/2001 | Waugh et al. | |
| 6,393,014 | B1 | 5/2002 | Daly et al. | |
| 6,418,324 | B1 | 7/2002 | Doviak et al. | |
| 6,519,242 | B1 | 2/2003 | Emery et al. | |
| 6,519,252 | B2 | 2/2003 | Sallberg | |
| 6,522,876 | B1 * | 2/2003 | Weiland et al. | 455/414.1 |
| 6,526,033 | B1 | 2/2003 | Wang et al. | |
| 6,535,607 | B1 | 3/2003 | Valentine | |
| 6,542,497 | B1 | 4/2003 | Curry et al. | |
| 6,545,992 | B2 | 4/2003 | Naqvi et al. | |
| 6,560,216 | B1 | 5/2003 | McNiff et al. | |
| 6,560,457 | B1 | 5/2003 | Silver et al. | |
| 6,584,095 | B1 * | 6/2003 | Jacobi et al. | 370/352 |
| 6,587,457 | B1 * | 7/2003 | Mikkonen | 370/356 |
| 6,591,103 | B1 | 7/2003 | Dunn et al. | |
| 6,594,666 | B1 | 7/2003 | Biswas et al. | |
| 6,614,781 | B1 * | 9/2003 | Elliott et al. | 370/352 |
| 6,671,506 | B1 | 12/2003 | Lee | |
| 6,678,524 | B1 | 1/2004 | Hansson et al. | |
| 6,680,923 | B1 | 1/2004 | Leon | |
| 6,683,870 | B1 * | 1/2004 | Archer | 370/356 |
| 6,711,146 | B2 * | 3/2004 | Yegoshin | 370/338 |
| 6,718,178 | B1 * | 4/2004 | Sladek et al. | 455/466 |
| 6,721,306 | B1 | 4/2004 | Farris et al. | |
| 6,721,565 | B1 | 4/2004 | Ejzak et al. | |
| 6,781,983 | B1 | 8/2004 | Armistead | |
| 6,798,772 | B2 * | 9/2004 | Bergman et al. | 370/354 |
| 6,816,912 | B1 * | 11/2004 | Borella et al. | 709/238 |
| 6,879,833 | B2 | 4/2005 | Oh et al. | |
| 6,882,838 | B1 * | 4/2005 | Lee et al. | 455/417 |
| 6,937,150 | B2 | 8/2005 | Medema | |
| 6,963,918 | B1 * | 11/2005 | Leung | 709/228 |
| 6,985,446 | B1 | 1/2006 | Hurtta et al. | |
| 7,003,295 | B1 | 2/2006 | Cook et al. | |
| 7,047,019 | B1 * | 5/2006 | Cox et al. | 455/456.1 |
| 7,072,323 | B2 | 7/2006 | Roberts et al. | |
| 7,130,296 | B2 | 10/2006 | McNiff et al. | |
| 7,228,355 | B2 | 6/2007 | Dowling | |
| 7,283,823 | B2 | 10/2007 | Pearce et al. | |
| 7,471,653 | B2 | 12/2008 | McConnell et al. | |
| 2001/0012282 | A1 | 8/2001 | Yegoshin | |
| 2002/0052754 | A1 | 5/2002 | Joyce et al. | |
| 2002/0058495 | A1 | 5/2002 | Chow et al. | |
| 2002/0155834 | A1 | 10/2002 | Olmstead et al. | |
| 2003/0076808 | A1 | 4/2003 | McNiff et al. | |
| 2003/0134648 | A1 | 7/2003 | Reed et al. | |
| 2003/0224795 | A1 | 12/2003 | Wilhoite et al. | |
| 2004/0062223 | A1 | 4/2004 | Boyd et al. | |
| 2004/0132500 | A1 | 7/2004 | Rogalski et al. | |
| 2004/0230697 | A1 | 11/2004 | Kiss et al. | |
| 2005/0078703 | A1 | 4/2005 | Kim et al. | |
| 2006/0011716 | A1 * | 1/2006 | Perkowski | 235/375 |
| 2006/0224664 | A1 * | 10/2006 | Giliberto et al. | 709/203 |
| 2007/0037569 | A1 | 2/2007 | McNiff | |
| 2007/0037610 | A1 * | 2/2007 | Logan | 455/574 |
| 2007/0147391 | A1 | 6/2007 | Wilhoite et al. | |

FOREIGN PATENT DOCUMENTS

| | | |
|---|---|---|
| WO | WO97/16916 | 5/1997 |
| WO | 00/08880 | 2/2000 |
| WO | 00/22805 | 4/2000 |
| WO | 00/38391 | 6/2000 |
| WO | 00/69156 | 11/2000 |
| WO | WO02/049298 A1 | 6/2002 |

OTHER PUBLICATIONS

*International Preliminary Examination Report* in PCT/US01/48920, Oct. 23, 2003.

* cited by examiner

CIRCUIT SWITCHED CELLULAR NETWORK TO INTERNET CALLING WITH INTERNET ANTENNAS

This is a continuation of co-pending International Application PCT/US01/48920 filed on Dec. 13, 2001 designating the United States and claims priority from 60/255,737 filed Dec. 14, 2000, 60/267,564 filed Feb. 8, 2001, 60/269,740 filed Feb. 16, 2001, and 60/286,711 filed Apr. 27, 2001.

TECHNICAL FIELD OF THE INVENTION

The invention relates to telephone systems and more particularly to a system and method for delivering a circuit-based wireless telephone call to a packet-based telephone call including a television cable system-based telephone call. In particular, it pertains to a system and method for detecting the entrance and exit of a mobile device within a domain of a packet network for purposes of switching call delivery and origination and the use of a general purpose packet switched network (the Internet) to connect mobile telephone switching centers to their antennas.

BACKGROUND OF THE INVENTION

As telephone devices have become widespread, it is common for people to have multiple telephone numbers for reaching them, such as home, office, mobile, and fax. People who work in more than one location have even more numbers. Various companies have designed one-number solutions to allow a single telephone number to be used for all calls directed to a person, wherever they may be. These solutions are called "trunk-looping" one-number systems because they require the connection of multiple trunks within a single switching device. Two basic strategies are used to provide current one-number solutions.

The first approach is to provide a single "primary" number which is associated with an individual at a certain location and allow the subscriber to manually "forward" all calls to any other number, one number after another. Typically, the primary number is associated with a mobile telephone which is the default forwarding location unless the subscriber indicates otherwise. However, this method requires direct actions from the subscriber upon arrival to a physical location, normally by entering digit strings through the subscriber's mobile telephone or through a local non-mobile telephone. It is difficult to remember to place such a forwarding call; the digits to be entered are difficult to remember; and it is unrewarding to undertake the complicated effort of informing the system of your present location and then receive no calls so people do not bother unless they are expecting an important call.

The other approach to obtaining a single telephone number (identity within the telephone system) is based on a subscriber-defined schedule established by time-of-day and day-of-week. Subscribers route ("forward") incoming calls based on their best guess at where they will be at a particular time. Call control logic directs the caller to the most likely physical location.

Both of these methods require the assignment of telephone numbers to each possible location. Although, in the present system, each usable telephone typically has an associated number, establishing many telephones and giving a number to each telephone is expensive, as each number typically incurs a minimum monthly charge. Also, because each call occupies four trunk lines, into and out of the subscriber's central office before reaching a central office for the local telephone, these approaches require a great deal of additional network capacity and are therefore very expensive for the telephone companies to implement.

An additional limitation of prior art trunk-looping one-number systems is the inability to use such systems when roaming. In the prior art, established schedules that redirect traffic to frequently visited locations become meaningless across multiple time zones. Manual forwarding to circuit-based numbers reduces reliability and trunk efficiencies for both the mobile carrier that provides the single number and for the long distance carrier. Service providers resist implementing either one due to perceived high infrastructure cost and/or financial risk due to delayed processing of charges incurred in non-owned networks when forwarded calls are received from other networks.

It would be desirable to be able to detect the presence or absence of a mobile telephone at a fixed location for the purpose of routing a call between the wireless network and a location based telephone on a packet switched network. A packet switched telephone can be less expensive and more private than a standard mobile telephone. Wireless telephone companies provide call delivery and origination using radio-based and circuit-switched-based signaling to an end-user device identified by a telephone number. Since a mobile telephone's identification number represents a single device, a subscriber must obtain additional telephone numbers to identify fixed locations such as office and home.

Also, the wiring for a general purpose packet switched network, the Internet, is now ubiquitous and additional IP (Internet Protocol) devices can be connected to this network with no additional cost for wiring. Because the wires are not used at their capacity, modest amounts of additional traffic can be placed on them with no additional cost for maintaining the Internet service. IP telephone devices that handle only a few calls at one time can be added in many places throughout the network without significant cost. If these devices are low power radio antennas, they can easily serve a few nearby wireless telephones. Because they are low power, they are inexpensive and create no local land-use opposition to placement. In contrast, traditional cell phone antennas are very expensive, are connected to their base stations with expensive dedicated wiring, and face considerable local land-use opposition to placement.

In the prior art, Internet access via a 28.8-, 33.6-, or 56-kbps modem is referred to as voiceband modem technology. Like voiceband modems, cable modems modulate and demodulate data signals. However, cable modems incorporate more functionality suitable for high-speed services. From a user perspective, a cable modem is capable of delivering up to 30 to 40 Mbps of data in one 6-MHz cable channel. This is approximately 500 times faster than a 56-kbps modem.

In cable modem systems, data from a user to the network is sent under control of a cable modem terminations system, which is a controller at the head end of the cable (CMTS). A subscriber can continue to receive cable television service while simultaneously receiving data on the cable to be delivered to a personal computer and sending data on the cable with the help of a splitter, which splits the signal to continue on in multiple cables.

Also in the prior art, there is the capability to send and receive data with dial-up telephone Internet services using the television as a display, such as Web-TV by Microsoft. However, it would be desirable, with subscriber interaction, a system to place or receive telephone calls utilizing a cable-television base application, IP telephones or 'Bluetooth or 802.11' devices, television displays using drop-down menus, and one-button remote-control inputs. Also, it would be advantageous to be able to detect the presence or absence of a mobile telephone near a device coupled to the global network via a cable-television type network connection for the purpose of routing a call between the wireless network or the public switched telephone network and a cable based IP (Internet Protocol) telephone connection utilizing the DOCSIS (Data Over Cable System Interface Specification) platform.

SUMMARY OF THE INVENTION

In one aspect, the instant invention solves the aforementioned problems by monitoring the subscriber's current physical location, identifying a local packet-based telephone device to which a call should be terminated, if any, and routing the call, all before the call is terminated ("answered") by any device at any location, so the caller does not incur connection charges unless the call is connected. In a preferred embodiment, it does so without direct subscriber actions, without a second telephone number for any local packet telephone device, regardless of the time of day or day of week.

If the subscriber arrives at a location that has the invented system, the system can route calls for that subscriber directed to the mobile network to a local packet telephone device with lower charges. Likewise, if the subscriber leaves a location where the subscriber is associated with local packet telephone device, it can route the call to the mobile network as a regular cell phone call to the subscriber. The subscriber can use his mobile telephone to connect to the packet network with a local radio link to a local low power antenna, thereby reducing the use of existing powerful cellular antennas which makes them available for use by others and and reduces the average cost of the system. Alternatively, the subscriber can use a local wired packet telephone (IP telephone) connected to the network, such as a computer with a microphone and speaker. This packet telephone does not have a number on the public switched telephone network and incurs no monthly charge from a telephone switching company. It is not usable until it is given an identity by association with a mobile telephone number.

In a preferred embodiment, the invention can be implemented using an existing mobile switching center (MSC). An aspect of the invention takes advantage of the MSC's capability to process call handling instructions from an existing Service Control Point (SCP) and to connect a call to an Internet Protocol Gateway (IP Gateway). Based on a preconfigured subscriber profile, the system has the capability of routing incoming calls to multiple devices attached to a local area network (LAN) or a wide area network (WAN). Outgoing calls acquire the calling party identity of the calling party's mobile telephone regardless of the device that originated the call.

Other options are also available, such as restricting telephone calls to/from certain telephone numbers, dialing a telephone number using one click on the called party name, viewing the location of a calling or called party, receiving a calling party's biographical information, and receiving distinctive alerting (ringing) in the voice of the calling party.

A preferred embodiment of the invention is implemented in software in a computer system that can be integrated into existing telephone communications systems for wireless telephones, including cellular and PCS telephones. In one aspect, the present invention is a system and method for communicating the location of a mobile device between the mobile switching center and the packet switched network. Protocols between the switch and the packet network define specific command and response codes which are communicated between the various components to permit specific activities to occur across a distributed network. Each of the command and response codes can include various parameters. In one embodiment, the instant invention uses additional commands, responses, and parameters within an existing protocol to signal between the switching system and the packet network to effect call control to private computer network domains.

One technical advantage of a preferred embodiment of the invention is a system that can detect the presence or absence of a mobile device within a local packet network domain and route the call immediately to the subscriber's current location without causing the voice channel to be rerouted from the least cost route. The detection is preferably done by detecting at local IP antennas attached to the packet network that the mobile phone, which periodically broadcasts a burst containing an identification, is close to the IP antenna so that calls to the mobile phone can be directed to the IP antenna across the general purpose packet network (Internet). The local IP antennas can receive and broadcast either standard cellular telephone frequencies or other radio frequencies such the ISM (Industry, Science and Medicine) band, as some mobile phones now work also in those frequencies. The local IP antennas are added to the IP network in locations that are frequented by mobile phone users. They can be configured to service any mobile phone in the vicinity or only designated mobile phones as determined by the owner of the IP antenna. The local IP antennas are low powered and inexpensive. By placing many of them within a cell, a cellular telephone service can greatly reduce its operating costs.

The foregoing has outlined rather broadly the features and technical advantages of aspects of the present invention in order that the detailed description of the invention that follows may be better understood. Additional features and advantages of aspects of the invention will be described hereinafter which form the subject of the claims of the invention. It should be appreciated by those skilled in the art that the conception and specific embodiments disclosed may be readily utilized as a basis for modifying or designing other systems or structures for carrying out the same purposes of any of many aspects of the present invention. It should be realized by those skilled in the art that such equivalent constructions do not depart from the spirit and scope of the invention as set forth in the appended claims.

An embodiment of the invention is implemented with software in a set-top box that can cause the set top box to be integrated into existing telephone communications systems for wireless telephones, including cellular and PCS telephones, and using existing cable-television infrastructure. In one aspect, the present invention is a system and method for communicating the location of a mobile device between the client terminal adapter (CTA), which is a microprocessor based device that couples to the cable modem and performs telephone functions using IP protocol, the MSC, and the cable television network. Protocols between the cable network, and the switched network define specific command and response codes which are communicated between the various components to permit specific activities to occur across a distributed network. Each of the command and response codes can include various parameters. In one embodiment, the instant invention uses additional intelligent call-processing commands, responses, and parameters within an existing protocol to signal between the switching system and the packet network to effect call control to cable-television based networks.

In one aspect, the instant invention solves problems of handoff by determining the subscriber's current mobile location within the macro mobile network. Then, utilizing a privately controlled transceiver as an alternate cell site, determines when a mobile enters communication range of the private transceiver, thereby causing the in-session call to be handed-off to the private domain. In a preferred embodiment, it does so with little direct subscriber action and without a second telephone number for the associated private domain device.

If the subscriber arrives at a location that has the invented system, the system can re-direct 'in-session' public domain mobile network calls for that subscriber to a private domain cell site with lower charges. Likewise, if the subscriber leaves a location where the subscriber is connected in a call with the private transceiver, it can hand-off the in-session call to the public network as a regular mobile phone call. This private domain device does not have a number on the public switched telephone network and incurs no monthly charge from a telephone switching company. It is not usable until it is given an identity and authorization, at subscription time, when mapped with a mobile identity number. The system takes advantage of the MSC's capability to process in-session call mobile assisted hand-off instructions and to re-route a call to a Mobile to Internet Gateway (MIG) which converts circuit signal to packets for the Internet.

A preferred embodiment of the invention is the implementation of software that can be integrated into existing telephony communications systems for wireless telephones, including cellular and PCS telephones, and into the existing Internet infrastructure. In one aspect, the present invention is a system and method for communicating the location of a mobile telephone between the access point, and the mobile switching center, via a packet network such as the Internet. Protocols between the mobile network and the circuit switched telephone network define specific command and response codes which are communicated between the various components to permit specific activities to occur across a distributed network. Each of the command and response codes can include various parameters. In one embodiment, the instant invention uses existing command and response codes as well as additional intelligent call-processing commands, responses, and parameters within an existing protocol to signal between the switching system and the packet network to effect call hand-off and control to and from the private transceiver on the Internet and the public mobile telephone networks.

One technical advantage of a preferred embodiment of the invention is a system and method that can detect the cell site cluster identification, or 'inference' signature of the cell sites that surround the private transceiver as well as the cell site that supports the location of the private transceiver. The system detects the presence of the mobile device within range of the private transceiver. It registers the mobile device and re-routes the call immediately to the subscriber's access point without causing the voice channel to be dropped. The detection and registration is preferably done when the subscriber's mobile phone sends a radio signal to the access point's transceiver. Using the ISM band of frequencies or any other suitable band, public or private, which the mobile telephone periodically broadcasts a burst containing its identification. When the mobile telephone is in proximity to the access point's transceiver's area of coverage, the access point detects the burst and forwards information from the telephone to the mobile network so that mobile in-session calls can be handed-off to the IP/MAC addresses of the access point across the IP-network. The handoff of the in-session mobile call to the private domain will also reduce mobile air-time charges and reduce mobile network traffic without significant cost.

Another aspect of the preferred embodiment of the invention is a system that can detect the departure of a mobile telephone from the access point's transceiver's area of coverage and deregister the device and re-route the call immediately via the public mobile network to the subscriber's current mobile location without causing voice channel interruption. The detection is preferably done when subscriber's private domain access point has determined that the mobile phone has moved outside the coverage area of the transceiver so that an in-session call should be handed-off to the mobile telephone across the public network.

The present system may, without subscriber interaction, screen a caller prior to routing the call to the end point, thereby reducing the inefficiencies associated with routing the call to the end point and preventing the distractions caused by the unwanted ringing at the end point. On calls that pass screening, the system may display information about the caller, including the subject of the current call, the history of past calls with the same caller, and a biography of the caller. The system may further enable a network-based caller screening system that is controlled by the subscriber using an Internet Protocol (IP) in conjunction with a browser-based graphical user interface (GUI).

In one aspect, the instant invention examines the identity of the calling party, determines whether the caller is allowed to complete a call to the dialed number, and appropriately routes the caller, all as the call is taking place and without direct subscriber action and prior to routing the voice traffic to the called party location. In one embodiment, the invention can be implemented using an existing mobile switching center (MSC). An aspect of the invention takes advantage of the MSC's capability to process call handling instructions from a Service Control Point (SCP) and based on a pre-configured subscriber screening profile, the invention has the capability of routing unwanted incoming calls to an alternate answering location such as voice mail, a recorded announcement, or an alternate number. Also, using an Internet Protocol (IP) based graphical user interface (GUI) and a pre-established subscriber profile, the invention has the capability of providing the subscriber with additional information about the caller such as calling party photograph, caller history and subject of the current call. The present invention may additionally provide other value added service options, such as viewing the location of a calling party, receiving the calling party's biographical information, and receiving distinctive alerting (ringing) in the voice of the calling party.

One embodiment of the invention is implemented with software in a computer system that can be integrated into existing telephony communications systems for wireless telephones, including cellular and PCS telephones, and using existing Internet infrastructure. In one aspect, the present invention is a system and method for communicating the status of a call between the switching systems, the SCP and the IP-network. Protocols between the IP-network, the switching systems and the SCP define specific command and response codes which are communicated between the various components to permit specific activities to occur across a distributed network. Each of the command and response codes can include various parameters. In one embodiment, the instant invention uses additional intelligent call-processing commands, responses, and parameters within an existing protocol to signal between the switching system, the SCP and the packet network to effect network based call screening control, closed user groups, caller history and biographical information services.

One technical advantage provided by the invention is a system that can screen a caller prior to call delivery so that an unwanted call may be re-routed immediately, preserving network resources by re-directing the call from its normal path.

Call screening criteria may be based on the caller's name and/or number, the subscribers location (office or home), calling party ID availability, and/or other information. Call screening criteria may be either inclusive or exclusive, meaning only certain parties or defined groups can or cannot pass filtering on any given date and/or time of day. Another advantage of the invention is that the subscriber receives additional information about the calling party, thereby improving communication and reducing the amount of time required for the call. The subscriber or a system administrator, through the use of a standard Internet connection and a graphical interface (as may be provided by a conventional web browser), may establish and maintain various screening profiles that define screening attributes, criteria, and/or caller profiles, as well as associated call routing options.

The foregoing has outlined rather broadly the features and technical advantages of aspects of the present invention in order that the detailed description of the invention that follows may be better understood. Additional features and advantages of aspects of the invention will be described hereinafter which form the subject of the claims of the invention. It should be appreciated by those skilled in the art that the conception and specific embodiments disclosed may be readily utilized as a basis for modifying or designing other systems or structures for carrying out the same purposes of any of many aspects of the present invention. It should be realized by those skilled in the art that such equivalent constructions do not depart from the spirit and scope of the invention as set forth in the appended claims.

BRIEF DESCRIPTION OF THE DRAWINGS

For a more complete understanding of an embodiment of the present invention and the advantages thereof, reference is now made to the following descriptions taken in conjunction with the accompanying drawings, in which.

DETAILED DESCRIPTION

Figure 1:
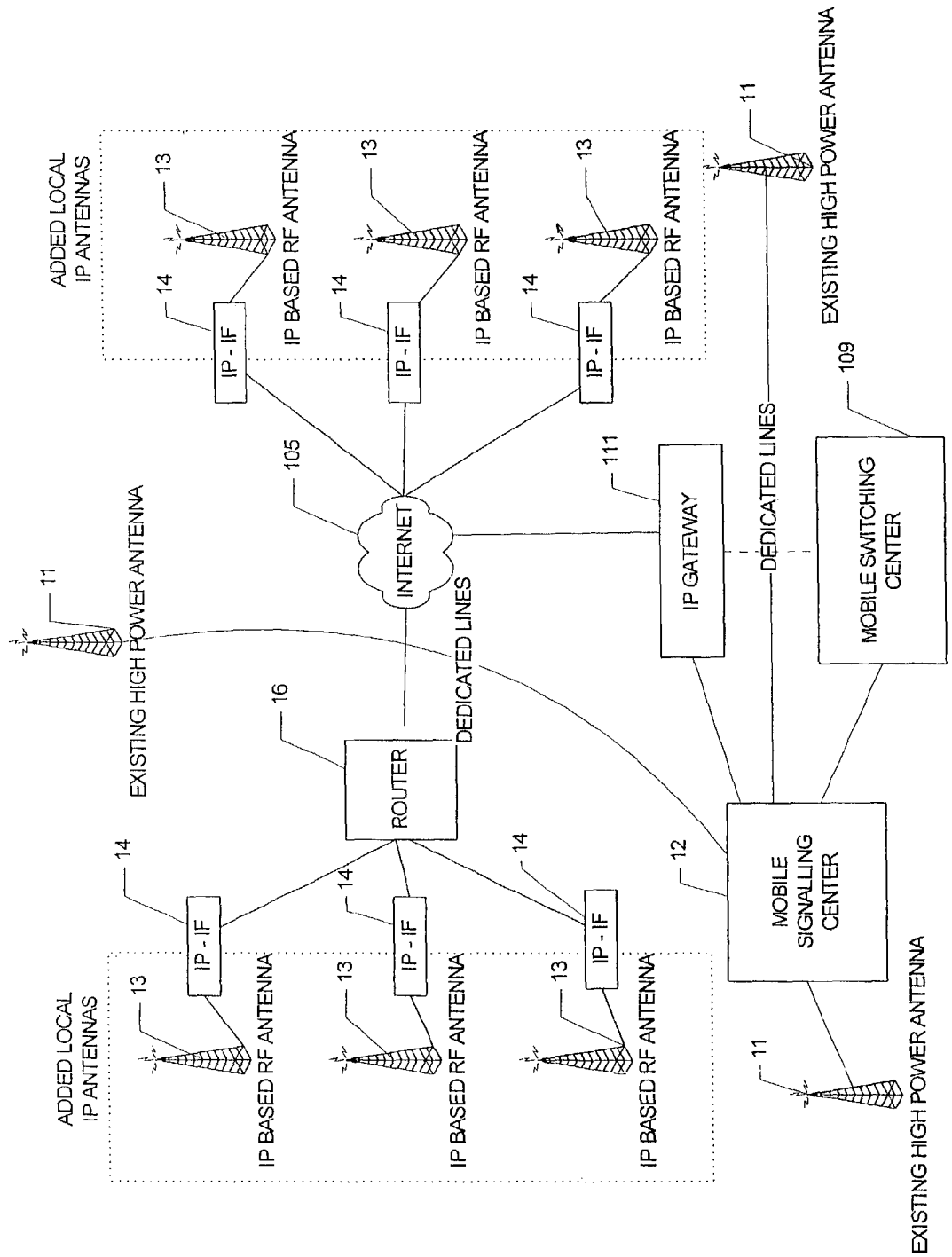
FIG. 1 shows the addition of new Internet Protocol cellular telephone antennas among existing high power cellular telephone antennas with dedicated wiring.

FIG. 1 shows 3 existing high power cellular antennas 11 all connected by dedicated lines to a single Mobile Signaling Center 12. Many local low power IP antennas 13 have been added within the same geographical region as the existing antennas 11. The IP antennas are each coupled to an IP interface 14 which is coupled to the general purpose packet switched network, the Internet 105, through a router 16. The IP interfaces 14 may have Ethernet connections to a router or standard cable modem connections or DSL connections or any other type of connection to the Internet. The Mobile Signaling Center 12 is also coupled to the Internet via an IP Gateway 111. When the signaling center 12 receives a message from an IP antenna that an identified subscriber mobile phone is in good communication with the IP antenna, the signaling center changes the connection route to the phone to stop using the high power antenna and switch to using the local IP antenna, using conventional switching decision algorithms. This reduces the load on the high power antenna.

Alternatively, the IP antennas can use radio frequencies other than standard cellular frequencies as described below. In this case, the IP Gateway 111 is preferably coupled directly to the Mobile Switching Center 109 as shown by a dotted line in FIG. 1 and described in more detail below.

Figure 2:
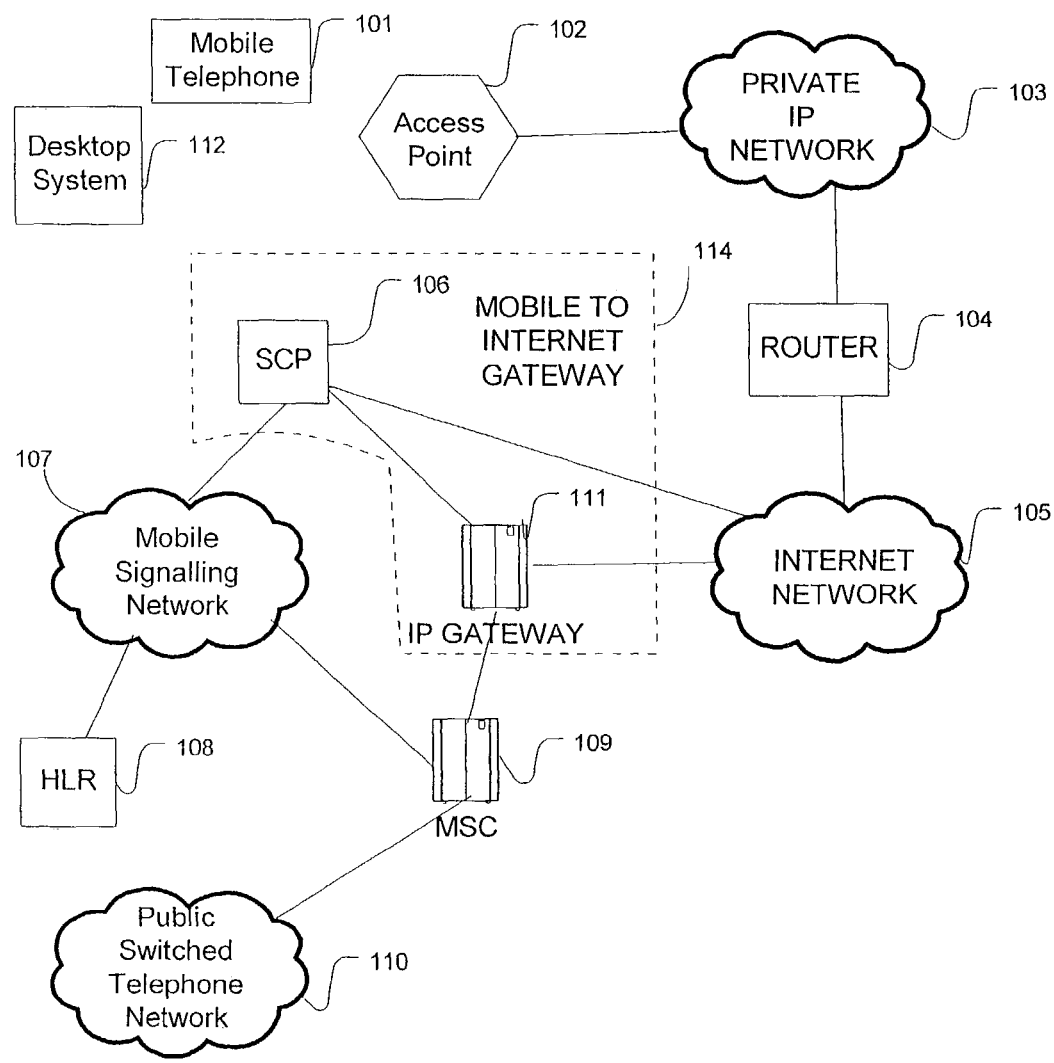
FIG. 2 is a block diagram of a call routing system employing an aspect of the present invention.

FIG. 2 is an illustrative example of a communications system using local IP antennas called "access points" 102 which operate on frequencies other than standard cellular frequencies. A mobile telephone subscriber unit 101 is in wireless communication with an access point 102 (a low-power 2-way wireless communications device, preferably radio, alternatively ultra sound or other electromagnetic frequencies such as infra-red), preferably using the Industry, Science and Medicine (ISM) band of frequencies or any other suitable band. Preferably, the access point uses a single communication process with the mobile telephone to both detect the proximity of the mobile phone and handle voice communications. Alternatively, the system can use GPS (Global Positioning Satellite) information from both the access point and the mobile phone to determine when they are in proximity to each other. The access point 102 is connected to a computer network 103 which is typically an Ethernet internet protocol local private network, but may be any packet-switched computer network. The network 103 is also connected to a router 104 that allows the network 103 to communicate with the Internet network 105 or any other packet-switched network.

In FIG. 2, a Mobile to Internet Gateway (MIG) 114 is added to the existing telephone system elements which consist of the Public Switched Telephone Network (PSTN) 110, Mobile Switching Centers (MSC) 109, the Mobile Signaling Network 107, and the Home Location Registers (HLR) 108. The Mobile to Internet Gateway consists of two components, a service control point 106 and an IP gateway 111.

A service control point (SCP) 106 is a redundant pair of processors that perform the call delivery and hand-off services. The SCP's design and function are similar to existing service control points such as: a number translation device like 1-800 dialing; a pre-paid calling platform; or a short messaging system. Generally, SCPs remove the call control logic from the MSC and the HLR into an independent (and presumably more intelligent) element. Unlike prior SCPs that simply assist the MSC in completing a session, the invented SCP 106, which is a part of the Mobile to Internet Gateway (MIG) 114, is a peer to the MSC and takes full control over the call. The MIG becomes the end office (class 5) switch and the mobile network is a simple tandem switch (class 4). The SCP 106 includes a database with information on all subscribers comprising an identification of the access point 102 with which the subscriber's mobile unit was last connected as their "visited" switch (in contrast to their "home" switch). A single access point may be listed as the last visited switch for any number of subscriber units. The SCP 106 is connected to the Internet network 105 in such a way as to allow messages and data to be exchanged with the router 104.

The SCP 106 is also connected to a mobile signaling network 107, which may be an existing Signaling System Seven (SS7) network using ANSI-41 or a Global System Mobility (GSM) network or any other signaling network for mobile communications devices. A conventional home location register (HLR) 108 and a conventional mobile switching center (MSC) 109 are also connected to the mobile signaling network 107, which allows the HLR 108 and the MSC 109 to exchange data with the SCP 106. The HLR 108 includes a database comprising information on the subscriber units that are assigned to the MSC 109 as their home switch. Typical implementations of an HLR combine subscriber profiles from wide geographic locations, for example, one company has-a single HLR for the entire west coast of the United States. The HLR contains the subscriber profile of record for purposes of call delivery, but does not hold billing information. HLR's are independent of MSCs, user groups, and companies, but are not shared by competitors. By contrast, the invented MIG, however, may be partitioned and shared by competitors. The MIG holds a subscriber profile as it pertains to the use of the IP antenna system, and maintains billing data.

Inside the Mobile to Internet Gateway 114, a conventional IP gateway 111 is connected to the SCP 106 via Ethernet (or any other packet-based method), which allows the gateway 111 to exchange data with the SCP 106. The gateway 111 is also connected to an ISUP (Integrated Services User Part) signaling network system. ISUP is the computer program application layer on top of SS7 that typical wire line central offices use today. The ISUP application allows the gateway 111 to transmit circuit-based telephone calls to or from the MSC 109. The ISUP system may be located proximate to the MSC or proximate to the IP gateway. The gateway 111 is also connected to a conventional IP signaling network (not shown) which allows the gateway 111 to exchange packet-based telephone calls with the Internet network 105 by known protocols such as H.323, SIP, or MGCP.

The subscriber unit 101 is in radio communication with the MSC 109 by conventional mobile telephone methods. When the subscriber unit 101 is turned on and attempts to register with the MSC 109, the MSC will get current configuration data for the subscriber unit 101 from the HLR 106 in a conventional fashion. The configuration data includes calling restrictions, call forwarding activity, message waiting indicator, authorizations, etc. Configuration data for the subscriber unit 101 retrieved from the HLR is stored in a conventional visitor location register (VLR) (not shown) that is a database located in the MSC 109. Data in the VLR is a subset of data in the HLR. Once the MSC 109 has the configuration data for the subscriber unit 101 stored in a VLR, then the MSC 109 can connect the subscriber unit 101 to called parties through the Public Switched Telephone Network (PSTN) 110 via existing cellular radio antennas 11 controlled by the MSC, by conventional methods. Also, the MSC 109 can route incoming calls from the PSTN 110 to the subscriber unit 101 via another MSC that may be closer to the subscriber unit, in a conventional fashion.

The subscriber unit 101 is also in radio communication with the SCP 106 via the IP antennas. The antennas may be cellular frequency antennas that are low power additions to the cellular network or they may use other frequencies that the mobile phone can use. In FIG. 1, the IP antenna is an access point 102 that operates by methods defined by ISM band technologies such Bluetooth and 802.11. When the subscriber unit 101 is turned on and attempts to register with the SCP 106 via the access point, the SCP will get current configuration data for the subscriber unit 101 from the HLR 106 in a conventional fashion. The configuration data includes calling restrictions, call forwarding activity, message waiting indicator, authorizations, etc. Configuration data for the subscriber unit 101 is stored in another 1 visitor location register (VLR) (not shown) that is a database located in SCP 106 created by use by the invented system. Once the SCP 106 has the configuration data for the subscriber unit 101 stored in a VLR, then the SCP 106 can connect the subscriber unit 101 to called parties through the Public Switched Telephone Network (PSTN) 110 via ISM band radio antennas controlled by the SCP 106, by conventional methods. Also, the SCP 106 can route incoming calls from the PSTN 110 to the subscriber unit 101 via another SCP that may be closer to the subscriber unit, in a conventional fashion.

Transfer Calls to IP Telephony Via the Mobile Telephone

In a preferred embodiment, when the subscriber approaches the access point, calls to and from the subscriber are connected to the mobile telephone via the access point and packet-based telephony. The subscriber unit 101 is in low power radio communication with the access point 102. When the subscriber unit 101 attempts to register with the access point 102, the access point sends registration data that includes the mobile id number and the electronic serial number for the subscriber unit 101 to an SCP 106 via the network 103, the router 104 and the Internet 105. Like the MSC as discussed above, the SCP 106 stores current configuration data in the additional visitor location register (VLR) (not shown) discussed above.

As discussed above, data in the additional VLR is similar to an MSC's VLR data, (restrictions, MWI, etc,) but in addition contains the IP address of the access point with which the mobile is associated. An analogy is the cell site and sector that currently serves a subscriber in the macro network. This system replaces the MSC which uses radio location addressing with a substitute switch using IP addressing. The additional VLR also contains enhanced features that were, by previous design, associated with proto-typical SCPs, features not supported by the HLR (and subsequently VLRs), like call history, closed user groups, call screening and pre-paid calling.

Once the subscriber's SCP 106 has received the current configuration data for the subscriber unit 101 from the HLR, then the SCP 106 can connect the subscriber unit 101 to called parties through low power radio to the access point, then via packet-based methods through the private network 103 to the IP gateway 111, and then via circuit-based methods to the PSTN 110. Also, the SCP 106 can instruct the MSC to route incoming calls from the MSC 109 to the subscriber unit 101 via circuit-based methods as far as the IP gateway 111 and then via packet-based methods through the Internet and the private network to the access point which is in low power radio communications with the subscriber unit.

By this process, use of expensive cellular antennas is greatly reduced, the subscriber may incur reduced airtime charges for use of the mobile telephone and, if the IP gateway 111 is local to the MSC, the subscriber will incur no long distance telephone charges.

Transfer Calls to IP Telephony Via a Local IP Telephone

In another embodiment of the invention, calls to and from the subscriber are transferred to a local packet-based (IP) telephone when the subscriber approaches the access point or initiates an action at the packet telephone. Although any type of packet telephone may be used, the preferred embodiment employs a desktop computer system 112 with a microphone and a speaker connected to the Internet. In one embodiment, the desktop system 112 is in radio communication with the access point 102. Alternatively, the desktop system 112 is directly connected to a router such as the router 104 via a network connection (preferably Ethernet) for communication between the desktop system and the access point or the SCP 106. By either of these communication methods, an IP address (or IP address and MAC sub-address) for the desktop system or other packet telephone is communicated to the SCP, either directly by the packet telephone or indirectly by the access point.

The subscriber registers with his SCP either by merely approaching the access point with his subscriber unit turned on or by taking an action at the desktop system or other packet telephone. When the subscriber registers with the SCP 106, the IP address of the desktop system 112 or other packet telephone is included in configuration data sent to the SCP for storage in a VLR at the SCP associated with the access point or the packet telephone. Once the SCP 106 has the configuration data for the desktop system 112, then the SCP 106 can connect the desktop system 112 to called parties through the IP Gateway 111 and the PSTN 110. Also, the SCP 106 can route incoming calls from the MSC 109 to the desktop system 112 via the Gateway 111.

By this alternative process, resources are made available on the expensive cellular system, the subscriber may incur reduced airtime charges for use of the mobile telephone and, if the IP gateway 111 is local to the MSC, the subscriber will incur no long distance telephone charges. Also, because the packet telephone has no number in a telephone system, there are no monthly charges to maintain a line to the telephone.

Implementation with Existing Systems and Protocols

In one embodiment of the present invention, a conventional SCP is modified to include software with appropriate capabilities to provide the above-described call delivery services between the mobile network and a packet network. The software module that handles the call delivery functionality in the SCP 106 is referred to herein as a service locator module. This functionality can be installed in existing SCP wireless telephone service equipment or can be included in stand-alone computers especially prepared for this purpose. The service locator module can operate in conjunction with existing telephone switching systems, including multiple MSC's and HLR's existing at various geographical locations, to provide the relevant functionality across a wide area in a cost-efficient manner. The MSC 109 communicates with the wireless subscriber units 101 that are within the MSC's geographical range at the time a call is made to or from the unit. A reselection can be made to any access point or local packet telephone no matter how or where the access point or telephone is connected to the packet switched network because there are no geographical limitations on such networks. Preexisting HLR's such as 108, and modified SCP's such as 106, each contain a database for each subscriber, with each subscriber being pre-assigned to a particular HLR and a particular SCP.

Mobile telephone communications between these various systems can take place through communications protocols defined in American National Standards Institute section 41 (ANSI-41) and section 721 (Integrated Services User Part) and European Telephone Standards Institute (ETSI) section Global System Mobility (GSM). Low-power radio communications to and from the access points can take place using International Electronics and Electrical Engineers (IEEE) section 802.11(b) or Bluetooth. Network communications can take place using Internet Engineering Task Force (IETF) Request for Comments 120 (TCP/IP).

Each of the communications protocols define a series of commands, responses, and related data that are exchanged between telecommunications devices, in which the commands and the responses can include the related data. The form of this communication can be roughly divided into commands (inter-device requests to perform a function), responses (replies to the command, signaling that the requested function is complete), and parameters (data that can be conveyed within a command or a response and which denotes specific operations or triggers). Operations are functions that can be performed, while triggers represent status flags that initiate operations. MSC's, HLR's, conventional service control points, IP gateways, and standard ANSI-41, GSM, and TCP/IP are well known to those of ordinary skill in the telecommunication industry, and their overall characteristics are not further described here. However, the following detailed descriptions will define how the illustrative example of the present invention interacts with these existing systems to provide the desired results by using specific ANSI-41, GSM, ISUP, TCP/IP, 802.11(b) and Bluetooth commands, responses, parameters, operations and triggers to communicate with the MSC and the HLR.

Call from the PSTN to a Subscriber

When a call is initiated from a number in the PSTN 110 to the subscriber unit 101, the MSC 109 commands the HLR 108 to provide routing instructions. As part of the call setup, the HLR 108 determines that the subscriber unit 101 is associated with locator services in the SCP 106. Accordingly, the HLR 108 commands the SCP 106 to provide routing instructions. The SCP 106 determines that the subscriber unit 101 is currently registered in an IP domain and returns routing information to the HLR 108. The HLR 108 returns the routing information to the MSC 109. The MSC 109 establishes the call to the gateway 111. The SCP 106 commands the gateway 111 to route the call via networks 105 and 103, and via the router 104 either to the subscriber unit 101 via the access point 102 or to the desktop system 112 or other packet telephone.

It will be understood in the example illustrated herein that although many of the triggers, detection points, operations and messages described herein are currently part of existing protocol standards, other triggers, detection points, operations and messages may be added to the standards at a later time. Additionally, various ones of the triggers and detection points described herein may be optional features that may be used in a system complying with the standards.

To interact correctly with the illustrative locator service module in the example system described herein, the HLR 108 requires two basic capabilities which existing HLR systems already offer:

1. Support a trigger to send ANSI 41 Routing Request messages or GSM Map Provide Roaming Number messages to the SCP 106, and
2. Support a parameter in the profile for the subscriber unit 101 that indicates subscription to locator services.

To interact correctly with the illustrative locator service module in the example system described herein, the MSC 109 requires the basic capability to allow the MSC 109 to recognize the MIG as a peer on the network. From the MSC's perspective, the MIG is simply a border switch. The MSC is not required to have specialized messages.

The following descriptions pertain to preferred embodiments using specific parameters that are currently available in known telephone network systems. These parameters and their identifying names are known to those of ordinary skill in the art and are therefore not provided herein with detailed descriptions.

Subscriber Registration

Registration occurs when a subscriber turns on his or her wireless telephone and establishes a communication link to the nearest access point 102. The access point identifies and authenticates the specific wireless telephone. Authentication is performed using a similar technique used in the first wireless networks. The process compares the reported MIN and ESN to recorded data. If they match, the authentication requirement is satisfied. The access point also sets up the appropriate operational data that can be used for the duration of the session.

Figure 3:
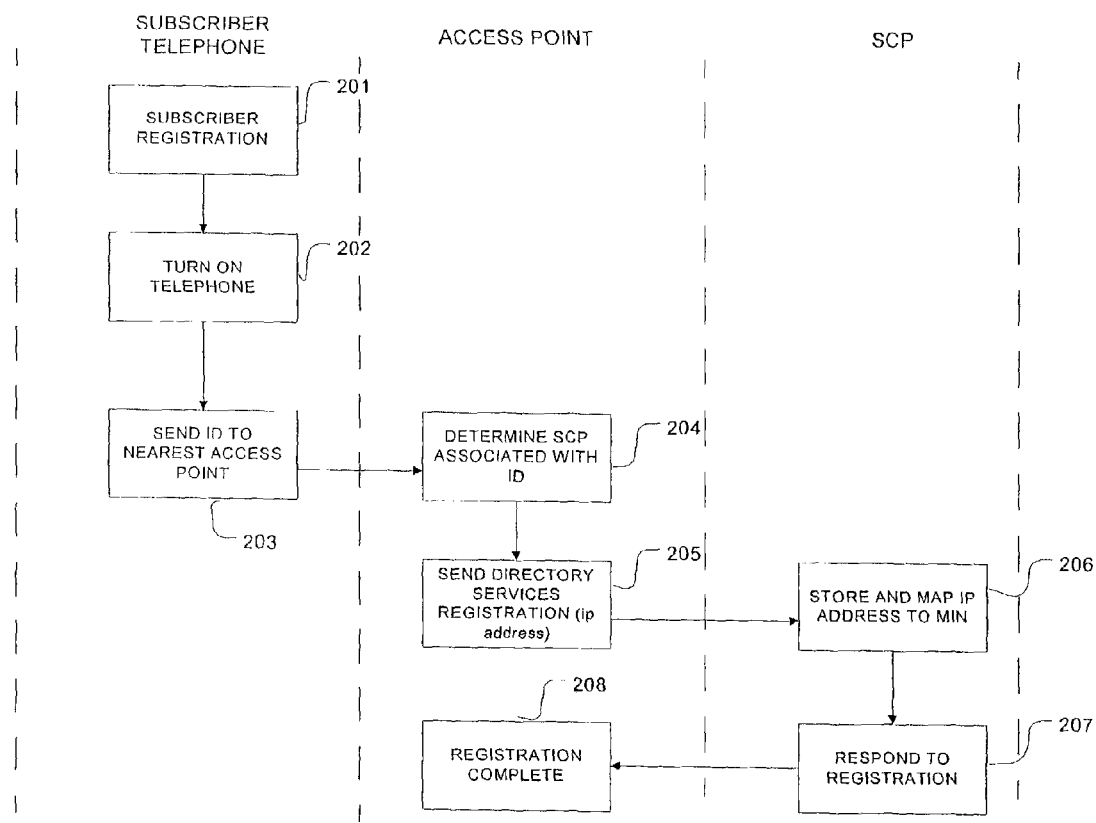
FIG. 3 is a flowchart illustrating subscriber registration within a private domain in an illustrative example of the present invention.

As can be seen in FIG. 3, subscriber registration 201 begins when the wireless telephone is turned on at step 202 and sends its unique identification to all of the access points within range at step 203. Alternately, the already active wireless telephone comes within radio coverage area of the access point, triggering the registration process. Based on the unique address, the access point determines which SCP is associated with that particular telephone at step 204 and sends the registration notification to that SCP at step 205. The registration message specifies the Mobile Identification Number (MIN), the IP address of the mobile's current location, and the Media Access Control (MAC) address which is a means a further identifying a unique appliance that shares the same IP address.

To avoid the problem of multiple access points providing conflicting information for a single subscriber to the SCP, the access point also sends data indicating the signal strength received from the subscriber unit and the SCP chooses the access point that receives the stronger signal. The SCP then instructs the other access point to cease servicing the subscriber.

The SCP retrieves the subscriber's profile database for the identified wireless telephone from the subscriber's HLR at step 206, thereby obtaining information on the capabilities and permitted activities of the subscriber. Given the capabilities of the serving private domain and the features set in the subscriber's profile, the SCP stores this information in its Visitor Location Register (VLR), which is a temporary subscriber database created just for the duration of this session. At this point,.Registration is complete and no other related activities occur until a call to or from the subscriber is attempted.

Call Termination

The first step in the call termination process is for the anchor MSC, which serves the subscriber's wireless telephone, to establish a connection to the Gateway, which serves the private domain.

Figure 4:
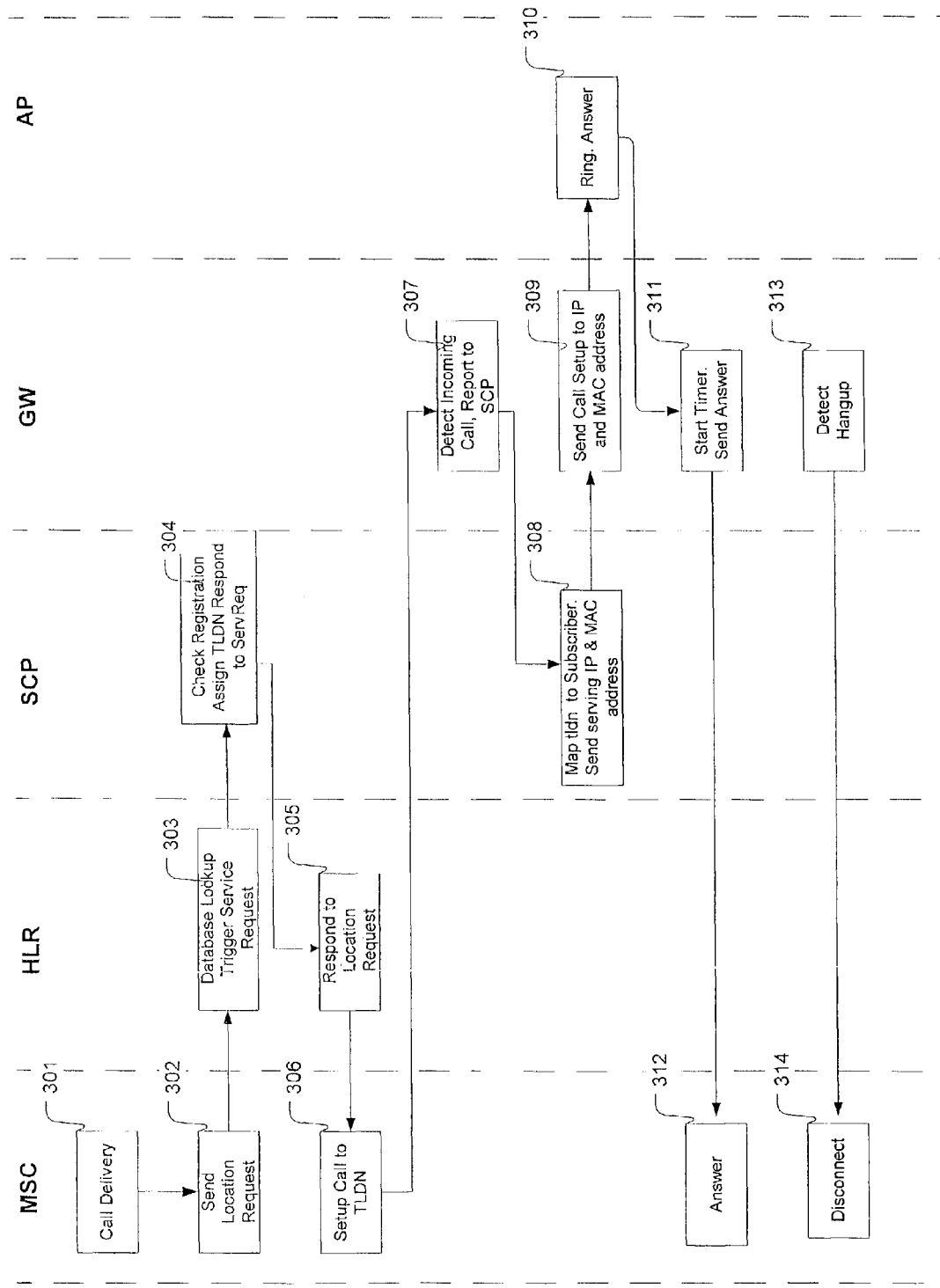
FIG. 4 is a flowchart illustrating call termination in an illustrative example of the present invention.

As shown in FIG. 4, Call Delivery process 301 starts when the anchor MSC sends an ANSI 41 Location Request message to the HLR at step 302, with a trigtype parameter indicating an incoming call (or a GSM Map Send Routing Information message). The HLR looks-up the subscriber's profile and determines that the subscriber's servreq trigger is armed for incoming calls to be routed via a particular SCP. The HLR launches a Route Request message to the SCP in step 303 that contains the MIN, an operation code indicating an incoming call, and the calling party identification.

If the SCP determines by checking its database that the subscriber is active within an IP domain and the subscriber profile indicates the subscriber accepts incoming calls from the calling party, it assigns a temporary local directory number (tldn) associated with the serving gateway and responds to the Route Request message in step 304. If the SCP determines that the subscriber is not active within an IP domain, or if the subscriber profile indicates the subscriber does not accept incoming calls from the calling party, the SCP responds to the Route Request message by responding with an actcode parameter that indicates 'continue processing'.

Steps 305 and 306 follow procedures which are known to those of ordinary skill in the art, and a detailed description is therefore not included here. The procedures establish a call between the MSC and the gateway 111.

Once the first call leg has been established to the gateway, the gateway sends a message to the SCP in step 307 that includes the tldn associated with the call. In step 308, the SCP indexes the tldn to the assigned subscriber profile, retrieves the IP and MAC addresses for the access point, and returns the addresses to the gateway.

In step 309, the gateway sends a call setup message to the access point (or desktop system or other packet telephone) that includes the calling party identification, calling party biography, and calling party call history. The access point (or desktop system or other packet telephone) rings in accordance with the calling party identification. The subscriber answers and the access point replies to the gateway's call setup message in step 310. The gateway starts a call timer and sends an answer message to the MSC in step 311. Upon receipt of the answer message, the MSC connects the speech path in step 312 and processing continues in a normal manner for a connected call.

When the called party hangs up, the Gateway detects this at step 313 and sends a disconnect message to the MSC. The MSC disconnects the calling and called party call legs at step 314. Alternatively, the MSC detects when the calling party hangs up and sends a disconnect message to the gateway. In this event, the gateway disconnects the calling and called party call legs.

Call Origination

Figure 5:
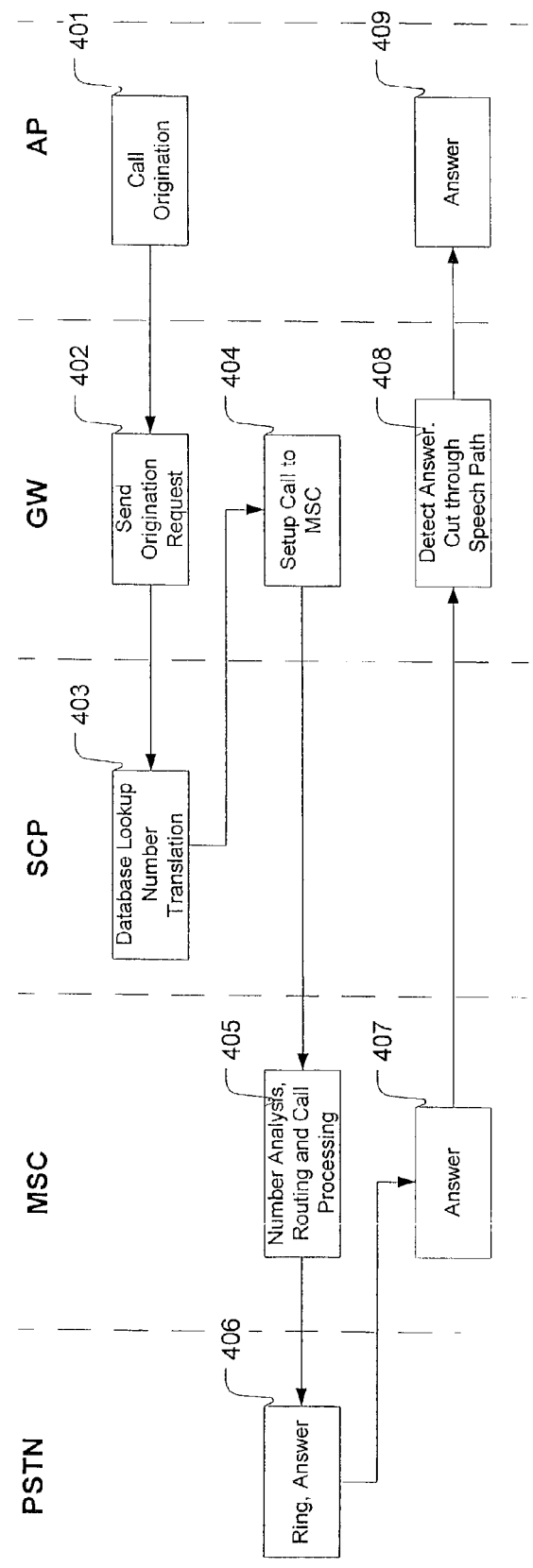
FIG. 5 is a flowchart illustrating call origination in an illustrative example of the present invention.

FIG. 5 shows that the Call Origination process 401 involves a series of communications between the access point (or desktop system or other packet telephone), the gateway, the SCP and the MSC. In one embodiment, the call delivery method may be embodied as software residing in the SCP. Alternatively, the call delivery method may be a function performed in the MSC. The process begins when the access point (or desktop system or other packet telephone) generates a call origination signal, with the dialed digits or dialed name at step 401.

The gateway 111 determines that the subscriber has an origination trigger enabled and sends an origination request command to the SCP 106 at step 402. The trigtype parameter indicates why the message was sent by identifying the type of trigger that initiated the message. The dgtsdial parameter indicates the telephone number or name dialed by the subscriber.

The SCP 106 performs a database lookup in step 403, using the content of the dgtsdial parameter as the key. Step 403 results in a translated telephone number that can be routed over the PSTN. The SCP 106 responds to the origination request from the gateway 111 with the translated number. At step 404, Gateway 111 seizes an outgoing trunk that is associated with MSC 109 and, using ISUP signaling, requests MSC 109 to dial the translated digits. Alternatively, Gateway 111 seizes an outgoing trunk that is associated with PSTN 110 and, using the same signaling techniques, dials the translated digits.

At step 405, MSC 109 analyzes the dialed digits, determines the least-cost route, seizes a trunk to PSTN 110 and, using ISUP signaling, requests the PSTN to connect to the called party. In an alternative embodiment, step 405 is eliminated.

Step 406 is the alert (ringing) at the called device and the resulting answer signal is propagated through steps 407, 408 and 409. Billing records begin at MSC 109 during step 407, and at Gateway 111 at step 408, and continue for the duration of the call. Call tear down processes are known to those skilled in the industry and are not repeated.

Implementation with Cable Television

Figure 6:
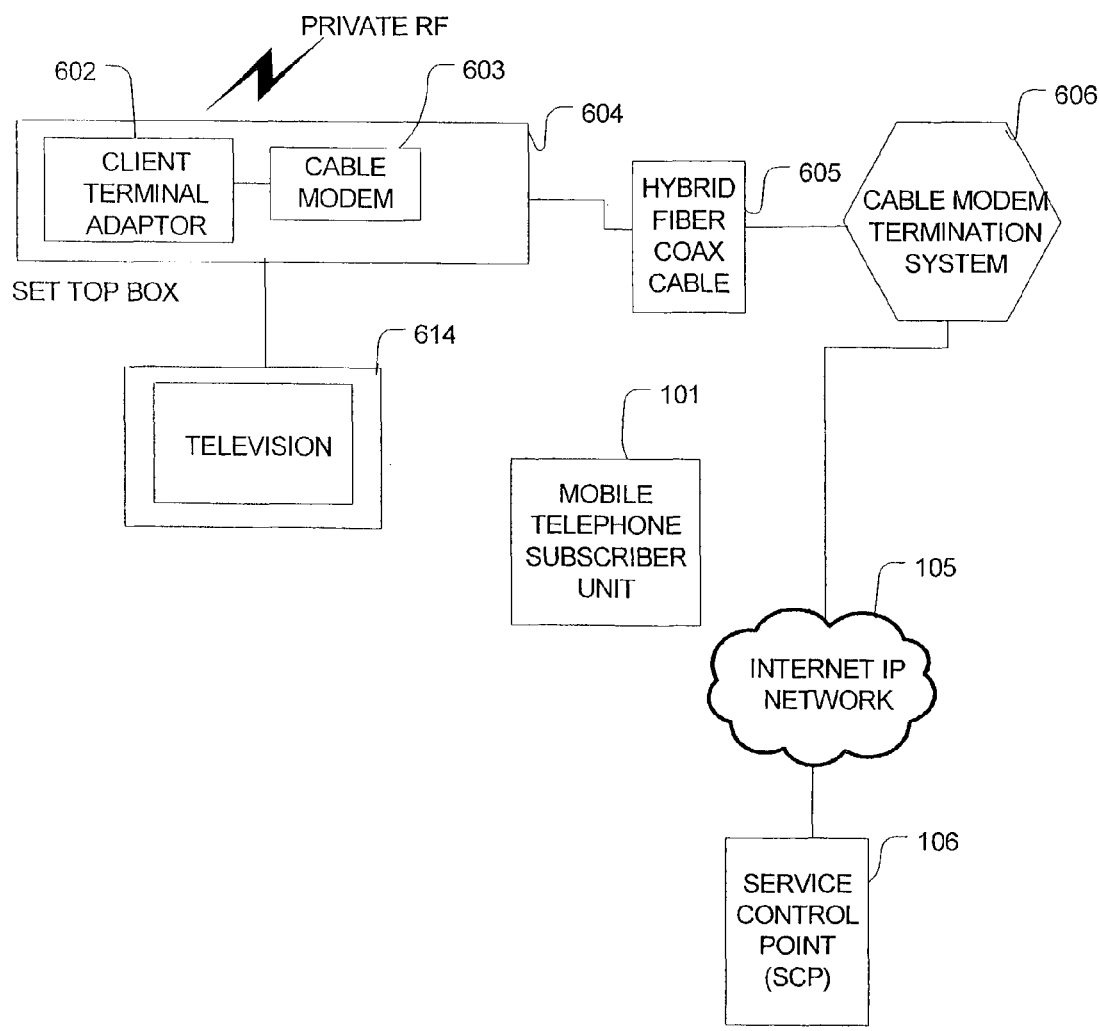
FIG. 6 is a block diagram of a call routing system using cable television.

As shown in FIG. 6, the Client Terminal Adapter 602 may be connected to a cable modem 603 which is responsible for information ingress and egress, utilizing the Data Over Cable System Interface Specification (DOCSIS), to/from the Internet Protocol (IP) network 105. The cable modem 603 implements standard QoS mechanisms of the underlying DOCSIS platform. It classifies packets and applies specific queuing or scheduling based of the results of the classification. The cable modem 603 is routed to the IP network 105 via the existing Hybrid Fiber Coax or Coax Cable (last mile) 605 and the Cable Modem Termination System CMTS (Head End) 606. The existing CMTS 606 platform enables the cable modem 603 to then communicate with the IP network 105.

Although any type of packet (IP) telephone may be used, in this embodiment the subscriber is in low powered radio communication with the CTA 602 and a set-top system 604 which is directly connected to the cable 605 and a television 614. This allows the CTA to communicate via the CMTS media transport router connections and the IP network to the SCP 106. An alternative embodiment employs a television set-top box 604 with either a microphone and a speaker or an IP telephone connected to the CTA. Another alternative embodiment employs a television set-top box 604 that is in communication with the subscriber via a combined wireless telephone/television remote control utilizing Infrared or a combination of Infrared and low powered radio. By either of these communication methods, the IP addresses and MAC sub-addresses for the CTA 602 and the Cable Modem 603 are communicated to the SCP by the client terminal adapter.

As well, the CTA 602 will provide technology that simplifies access, via the television, to the audio and visual indications and controls for the telephone, such as:

(1) automatic television muting when a call comes in or a call is placed to avoid conflict with a phone call, (2) calling party ID or call/caller history indication on the TV display, (3) ringing tone and telephone volume selection via the hand-held remote/telephone with status display, (4) ring-back tone played on the television speaker and a ring-back indication on the TV display, (5) television displayed drop-down menus (picture-in-picture style) for controlling the telephone, including placing calls to a number or destination or person selected from an address book list.

Also, the CTA 602 will provide limited audio and visual indications and controls, such as ringing, ring-back tone and message waiting indicator light for use when the television is off or while recording television shows. Alternatively, the function for recording shows, such as with a VCR, can be left unaffected by the circuit that adds telephone related audio and video output intended for the subscriber. Then the recording function is unaffected. This can be accomplished by using a channel tuner in the VCR to select the program to be recorded, as is conventional, and routing the VCR output that allows monitoring of the program being recorded to the set top box rather than to the TV. The set top box then merges the telephone audio and video signals together before the signals are sent on to the TV.

Mobile Assisted Hand-Off

Figure 7:
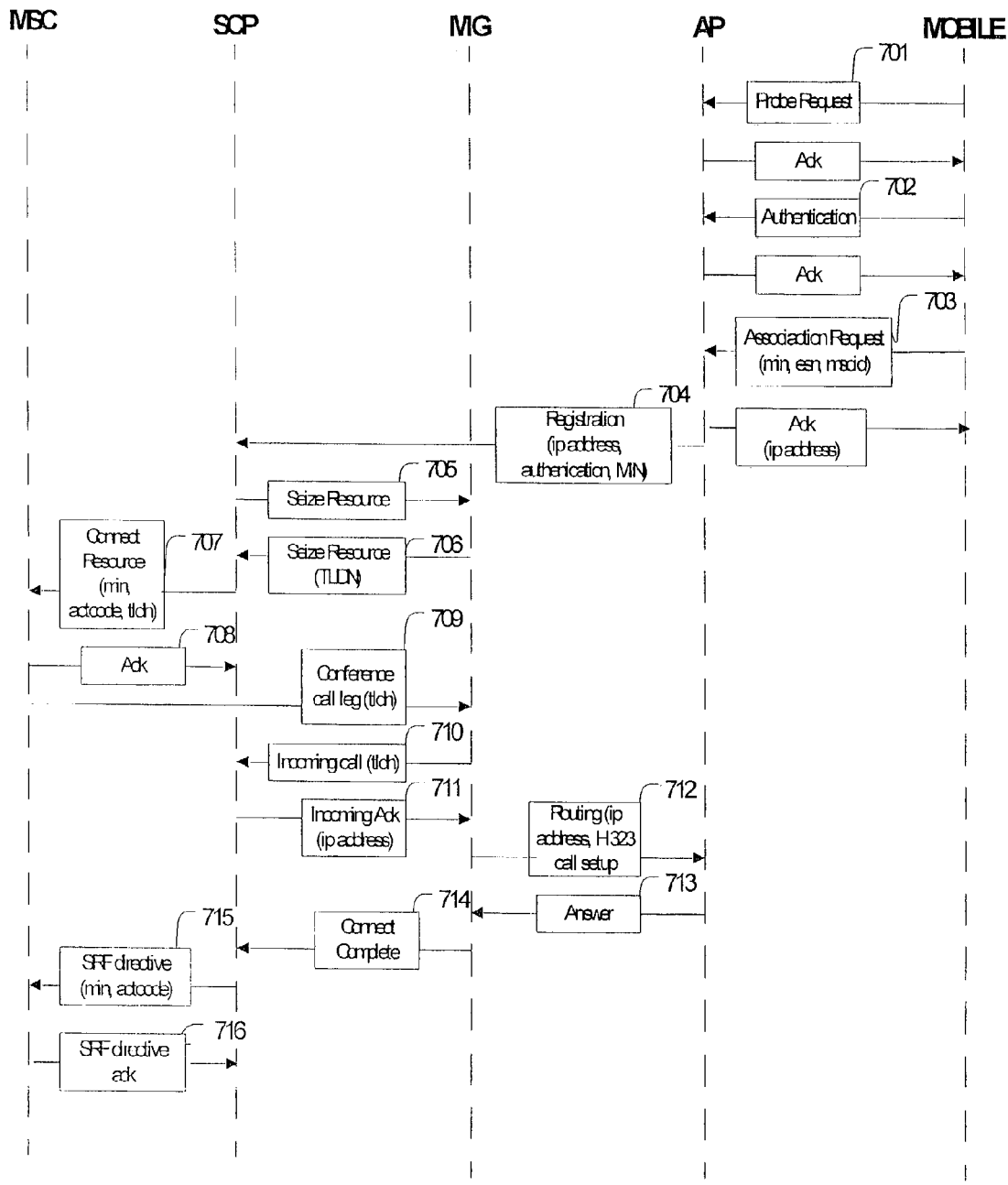
FIG. 7 is a flowchart illustrating call hand-off at registration within a private domain in an illustrative example of the present invention.

FIG. 7 shows the subscriber registration process. Using the established mobile telephone system features, the subscriber's mobile telephone regularly detects the cell site cluster identification, or 'inference' signature of the cell sites that surround the mobile telephone. This process informs the mobile telephone of this information for the cell site that normally supports the subscriber's access point. In step 701, the mobile telephone perpetually scans for a private wireless radio device, such as 'Bluetooth' or '802.11', utilizing a Private System Identification (PSID) protocol or any other means to detect and identify the private wireless device by which the access point periodically announces its identification. The mobile telephone is programmed to respond only to an access point with a designated identification. If the identification is correct, the mobile telephone establishes a communication link to the Access Point. In step 702, the Access Point identifies and authenticates the specific wireless telephone to ensure that the telephone is one that the access point is authorized to connect to. In step 703, the telephone indicates to the access point its mobile identification number (MIN) and the Electronic Serial Number (ESN), as well as, if there is a call in-progress, the serving cell site and sector. A processor within the access point or a processor in a computer to which the access point is connected compares the reported MIN and ESN to recorded data stored in the access point. If they match, the authentication requirement is satisfied. The access point also sets up the appropriate operational data that can be used for the duration of the session after hand-off. In step 704, the access point reports to the SCP all of the data required for a hand-off of the call, including IP address, MIN, and ESN.

The SCP retrieves the subscriber's profile database for the identified wireless telephone from the subscriber's HLR (not shown in FIG. 7), thereby obtaining information on the capabilities and permitted activities of the subscriber and the access point. Given the capabilities of the serving private domain and the features set in the subscriber's profile, the SCP stores this information in its Visitor Location Register (VLR) (not shown in FIG. 7), which is a temporary subscriber database created just for the duration of this session. At this point, Registration is complete and is awaiting the call hand-off attempt.

As shown in FIG. 7, the first step in the in-session call hand-off at registration process is as the mobile enters the cell site coverage area for private domain, the mobile initiates registration using the probe request, step 701, authentication, step 702, and association, step 703, processes with the access point. In addition to information described above passed to the access point in step 703, the association message contains an identification of the anchor MSC, which serves the subscriber's wireless telephone, so that the MSC can be instructed to establish a connection to a MIG, which connects to the private domain.

The Call Hand-Off process starts when the Access Point sends a Registration Notification, step 704, to the SCP indicating, among other things, the serving MSC and that a call in-progress will be handed off to the private domain. The SCP sends a Seize Resource message, step 705, to the MIG requesting a temporary local directory number (TLDN). The MIG sends the TLDN to the SCP with the seize resource acknowledgement (Ack), step 706. The SCP sends the serving MSC a Connect Resource message, step 707, identifying the call by its MIN, Cell Site Sector, and the TLDN associated with the MIG. The MSC returns an acknowledgement, step 716, and sets up the conference call leg to the MIG using the TLDN, step 708. Upon receipt of the incoming call on the TLDN, the MIG launches a query to the SCP, step 709, that includes the TLDN. The SCP returns the IP address of the access point, step 710. The MIG routes the call to the access point, step 711, and the access point alerts (signals) the hand-off. The subscriber's telephone answers the call, step 712, and the MIG cuts through the speech path to the telephone. The MIG then sends a Connection Complete message to the SCP that contains the TLDN, step 713. The SCP then sends the serving MSC a Specialized Resource Function (SRF) directive, step 714, which includes the MIN and an Action Code (actcode) indicating 'drop first leg'. The MSC releases the call leg to the cell site and responds with the SRF directive response, step 715.

Figure 8:
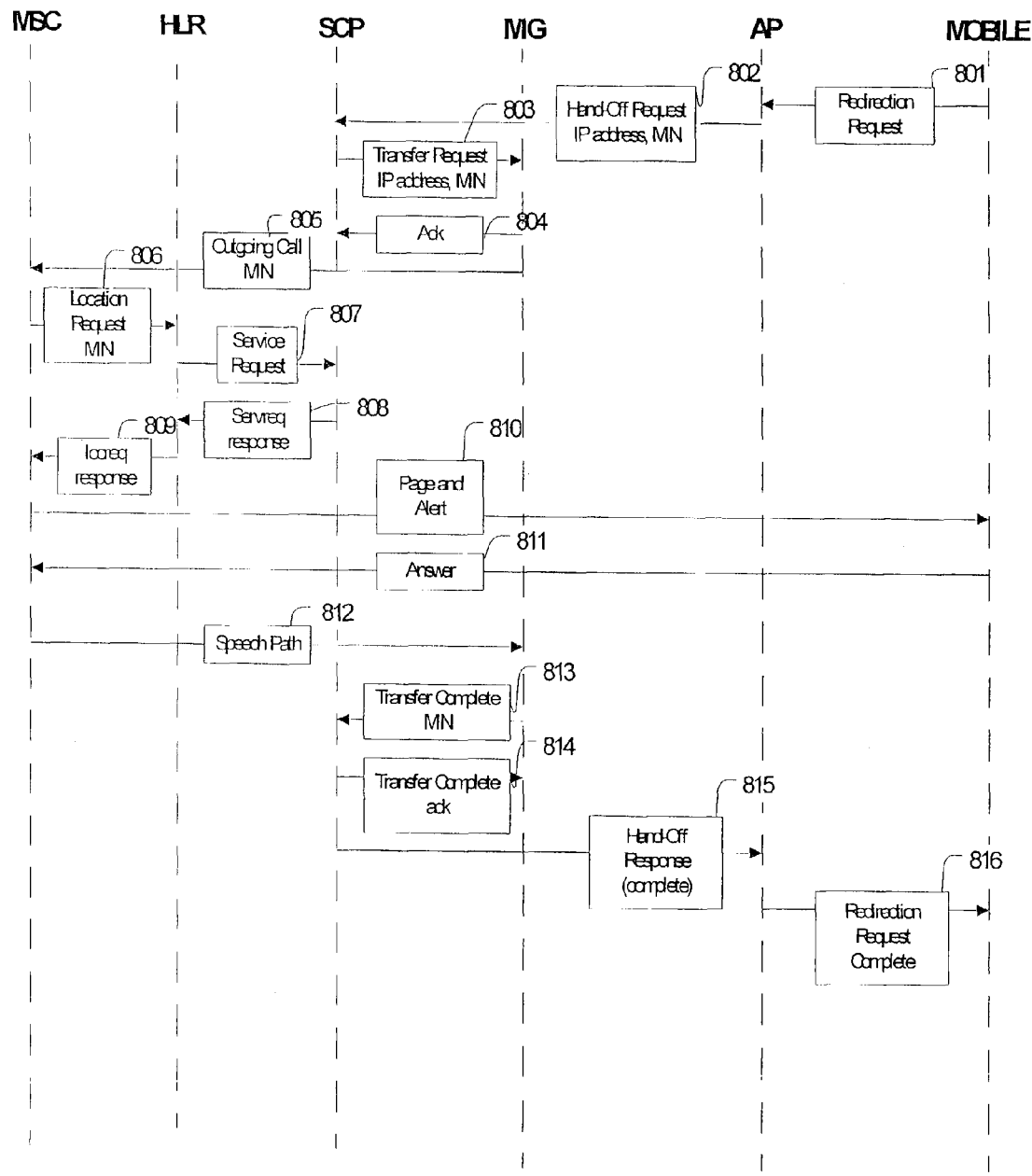
FIG. 8 is a flowchart illustrating call hand-off at de-registration from the private domain in an illustrative example of the present invention.

FIG. 8 illustrates that the process for handing off the communication link from an access point to the macro mobile network involves a series of communications between the access point, the MIG, the SCP and the MSC.

The subscriber has a call in-progress that originated in the private domain and wants to continue the call in the mobile domain. The subscriber launches a Redirection Request to the Access Point, step 801. The Access Point sends a Hand-Off request to the SCP that contains the new destination MIN and the currently serving MSCID. The SCP sends a Transfer Request to the MIG that contains the IP address of the current call and the Mobile ID, step 803. The MIG acknowledges the transfer request, step 816. The MIG seizes an outgoing trunk and dials the mobile number, step 804. The call arrives at the mobile's serving (anchor) MSC. The MSC sends a Location Request to the HLR, step 805. The HLR has previously set triggers points in the MIN's profile that instruct the HLR to launch a Service Request message to the SCP, step 806. The Service Request contains the MIN and the calling party ID. The SCP checks the subscriber's state of activity and determines that the mobile is the destination device (no longer the access point) and should be called on the public mobile network rather than the packet network. The SCP returns the mobile ID and an Operation Code (op code) to the HLR, step 807. The op code is forwarded by the HLR to the MSC, step 808, indicates that the MSC should page the mobile using its own radios. The MSC pages and sends an alert to the mobile, step 809. The subscriber answers, step 810, and the MSC cuts through the speech path to the MIG, step 811. The MIG connects the original outgoing circuit to the new outgoing circuit, completing the path between the mobile and the other party. The MIG sends a Transfer Complete message to the SCP, step 812, and the SCP returns the ack, step 813. The SCP sends a hand-off response message to the access point, step 814, and the access point launches a request response to the Mobile, step 815, ending the call session.

Call Screening

Figure 9:
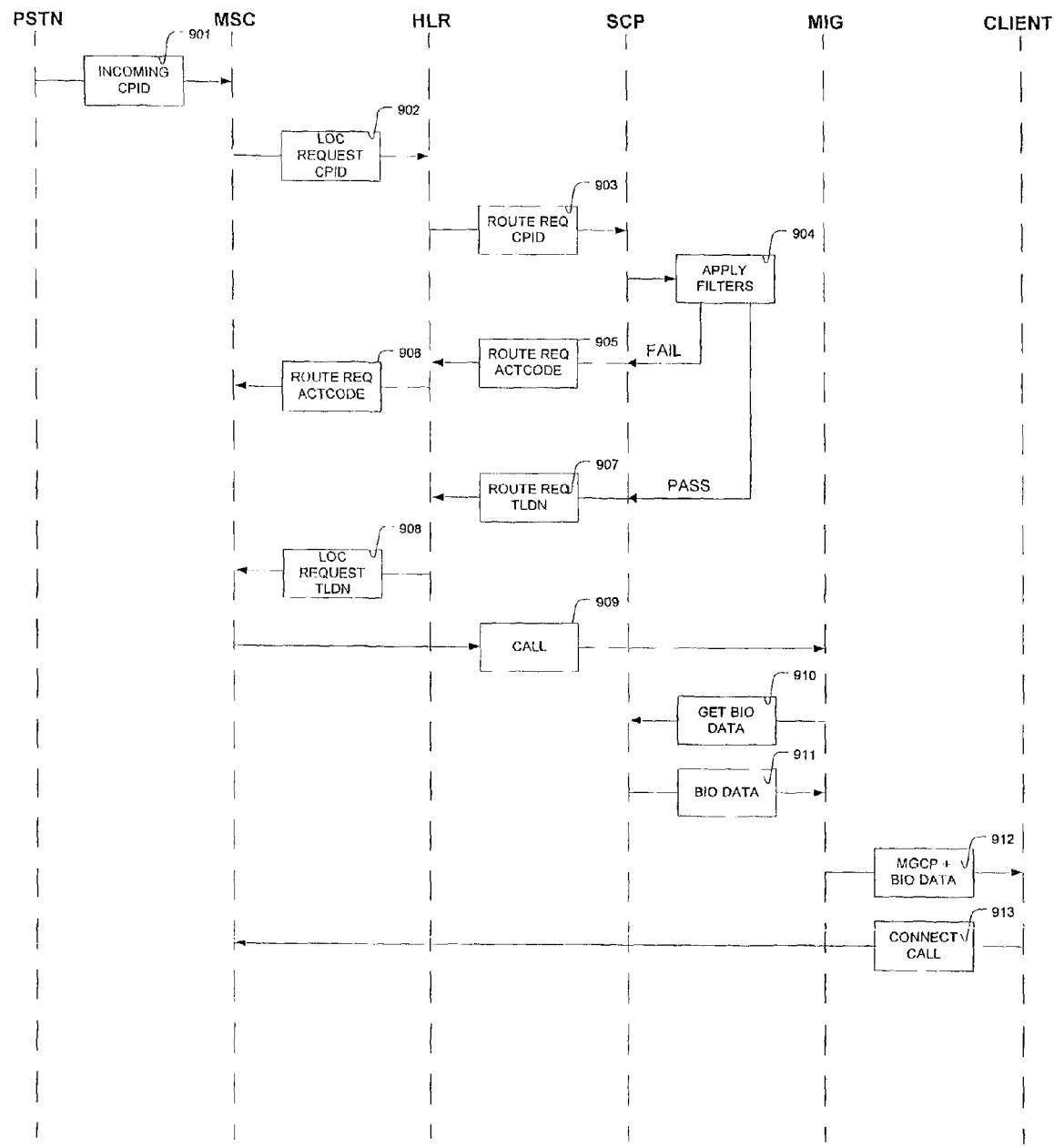
FIG. 9 is a flowchart illustrating call screening and calling party biographical data retrieval within a private domain in an illustrative example of the present invention.

As shown in FIG. 9, when a call is initiated from a number in the PSTN, step 901, utilizing an ISUP application, which indicates the Calling Party Identification (CPID), the serving MSC launches a Location Request that includes the CPID to the HLR requesting routing instructions, step 902. Accordingly, the HLR forwards a Route Request, step 903, instructing the SCP to provide routing instructions. In step 904, the SCP applies restrictions indicated by a pre-determined call screening profile, some of which may be based upon subscriber location; date and/or time of day; and/or calling party name and/or number. If the SCP determines that the profile indicates the subscriber does not accept incoming calls (fails screening) from the calling party, the SCP responds to the Route Request message by responding with an actcode parameter, step 905, which indicates, based on the reason code, 'continue processing' to an alternate number, recorded announcements or voice mail.

As shown in FIG. 9, when a call is initiated from a number in the PSTN, step 901, utilizing an ISUP application, which indicates the Calling Party Identification (CPID), the serving MSC launches a Location Request that includes the CPID to the HLR requesting routing instructions, step 902. Accordingly, the HLR forwards a Route Request, step 903, instructing the SCP to provide routing instructions. In step 904, the SCP applies the predetermined call screening restrictions, some of which may be based on subscriber location, time of day and calling party name and/or number. If the SCP determines by checking its database that the subscriber accepts incoming calls (passes screening) from the calling party, it assigns a temporary local directory number (TLDN) associated with the serving gateway and responds to the Route Request message in step 907. The HLR returns the routing information to the MSC, step 908. The MSC sets up the call leg to the MIG using the TLDN, step 909. Upon receipt of the incoming call on the TLDN, the MIG launches a query to the SCP for caller biographical data and call history, step 910. The SCP replies with the requested data, step 911. The MIG forwards the requested biographical information to the IP address of the client, step 912. The subscriber answers the call and the MIG then sends a create connection message to the MSC, step 913. As discussed by previous design, upon receipt of the answer message, the MSC connects the speech path, and call processing continues in a normal manner for a connected call.

What is claimed is:

1. A method for providing communications services to a mobile telephone device and a first end user telephone device, the mobile telephone device and the first end user telephone device being physically separate and distinct from each other, the method comprising:

(a) having a telephone system using telephone numbers where a direction for routing a call to a number is specified in a rewritable memory within the telephone system and the direction specifies that a call be routed to a network address in a packet switched network via a gateway from the telephone system to the packet switched network;

(b) receiving an instruction to specify in the memory a direction that a call, to a telephone number associated with the mobile telephone device operable in a cellular network, be routed to a network address of the first end user telephone device on the packet switched network at which the call is terminable, wherein the instruction is received during a registration of the mobile telephone device with the packet switched network when the mobile telephone device is proximal in location to the first end user telephone device; and (c) saving the direction in the memory.

2. The method of claim 1 where the telephone system is a mobile telephone system.

3. The method of claim 1 where the instruction is received in the telephone system from the first end user telephone device on the packet switched network via the packet-switched network.

4. The method of claim 3 where a radio access point in electronic communication with the first end user telephone device receives from a mobile telephone the mobile telephone's mobile identification number and forwards information identifying the identification number to the telephone system which uses the information to determine the telephone number for which the routing direction is to be saved.

5. The method of claim 3 where the instruction is received while a call is in progress and the call is redirected to the first end user telephone device while the call is in-progress.

6. The method of claim 3 where the first end user telephone device on the packet-switched network is coupled via a cable television cable based packet-switched network access.

7. The method of claim 1 where the first end user telephone device is a telephone adapted for use on a packet switched network.

8. The method of claim 1 where the first end user telephone device is a computer system.

9. The method of claim 1, further comprising:

receiving an instruction to specify in the memory a second direction that a call, to the telephone number associated with the mobile telephone device operable in the cellular network, be routed to a network address of a second, different end user telephone device on the packet switched network at which the call is terminable; and saving the second direction in the memory.

10. The method of claim 1, further comprising:

coupling to the mobile telephone device a Bluetooth or 802.11 device operable to detect a presence of the mobile telephone device in the packet switched network.

11. The method of claim 1, wherein no pre-existing relationship exists between the network address of the first end user telephone device on the packet switched network and the telephone number of the mobile telephone device prior to receiving the instruction during the registration of the mobile telephone device with the packet switched network.

* * * * *